United States Patent [19]
Laichinger et al.

[11] Patent Number: 5,261,691
[45] Date of Patent: Nov. 16, 1993

[54] LEVELING SYSTEM FOR VEHICLES

[75] Inventors: Martin Laichinger, Ebersbach; Martin Scheffel, Vaihingen-Enzweihingen, both of Fed. Rep. of Germany

[73] Assignee: Robert Bosch GmbH, Stuttgart, Fed. Rep. of Germany

[21] Appl. No.: 882,716

[22] Filed: May 14, 1992

[30] Foreign Application Priority Data

May 14, 1991 [DE] Fed. Rep. of Germany ....... 4115593

[51] Int. Cl.⁵ ........................................... B60G 17/015
[52] U.S. Cl. ..................... 280/714; 280/6.1; 280/6.12
[58] Field of Search ............... 280/714, 840, 6.1, 6.12; 180/41

[56] References Cited

U.S. PATENT DOCUMENTS

| | | | |
|---|---|---|---|
| 4,238,128 | 12/1980 | McKee | 280/6.1 X |
| 4,360,191 | 11/1982 | Urushiyama | 280/714 X |
| 4,593,920 | 6/1986 | Natsume et al. | 180/41 X |
| 4,593,931 | 6/1986 | Shiratori et al. | 180/41 X |
| 4,958,850 | 9/1990 | Buna et al. | 280/840 X |
| 5,013,061 | 5/1991 | Fujimara et al. | 280/714 X |
| 5,048,867 | 9/1991 | Gradert | 280/840 |
| 5,090,726 | 2/1992 | Nakamura | 280/714 X |
| 5,176,404 | 1/1993 | Sulzyc | 280/714 X |

FOREIGN PATENT DOCUMENTS

3825279 2/1990 Fed. Rep. of Germany.
0089210 5/1984 Japan ......................... 280/6.1

*Primary Examiner*—Margaret A. Focarino
*Assistant Examiner*—Peter English
*Attorney, Agent, or Firm*—Edwin E. Greigg; Ronald E. Greigg

[57] ABSTRACT

A leveling system for motor vehicles, having two work actuators each assigned to one vehicle axle, between a respective wheel suspension in the vehicle body and having a proportional pressure control valve associated with each actuator. The pressure control valves have three switching positions for alternatingly connecting the pressure chambers of the associated actuators to a pressure fluid source and a pressure fluid tank, and for blocking off the pressure chambers. To prevent unstable driving conditions if the leveling system should fail, it is assured by structural provisions that in the pressure chamber blocking phase of the two actuators their two pressure chambers communicate with one another via a throttle. As a result, greatly different pressures in the two actuators at the moment they are blocked can be equalized, so that the unstable behavior of the vehicle is avoided. The throttle restriction is provided in pressure-tight seat valves which are incorporated between the proportional pressure control valves and the actuators.

20 Claims, 2 Drawing Sheets

LEVELING SYSTEM FOR VEHICLES

BACKGROUND OF THE INVENTION

The invention is based on a leveling system for vehicles, of the type as defined hereinafter.

A leveling system of this kind, known for instance from German Patent Document DE 38 25 279 A1, serves to stabilize and regulate the level of the vehicle body of a motor vehicle. There is one hydraulic work cylinder, known as an actuator, disposed on each vehicle wheel between a wheel guide member and the vehicle body. By suitably adjusting the pressure at the work piston of the work cylinder, the vehicle body is raised to a certain level and kept there, and upon cornering, righting of the vehicle body in a way that counteracts the inclination of the curve, is brought about. Suitable provisions assure that if the leveling system fails the pressure chambers of the actuators are blocked off, so that the instantaneous pressure in the pressure chambers is maintained. However, if the pressures in the actuators for the right and left wheel guide members vary considerably from one another, the vehicle is moved out of the horizontal position into an oblique position, which on the one hand considerably lessens the comfort of the ride and on the other leads to dangerous driving conditions.

OBJECT AND SUMMARY OF THE INVENTION

The leveling system according to the invention has an advantage over the prior art that in the blocking off phase of the actuators a bypass is opened, so that an equalization of pressure can take place on both sides of the vehicle between the blocked-off pressure chambers of the actuators. The same pressure is thus established in the left and right actuators, and unstable driving conditions in the event that the leveling system should fail are avoided. Tilting on one vehicle side may optionally be reduced by means of a stabilizer or by a force transmission ratio of the actuator (axle geometry) that is dependent on the spring deflection travel. With an additional bypass valve between the actuators of the two vehicle axles, stabilization of the vehicle can moreover be attained if the leveling system fails in the course of a pitching motion of the vehicle.

In a preferred embodiment of the invention, the blocking off of the pressure chambers is effected by a respective pressure holding valve disposed in the connection between each proportional pressure control valve and the associated actuator. The throttle connection between the pressure chambers of the actuators is effected via the pressure holding valves.

In an advantageous embodiment of the invention, the two pressure holding valves are combined into a valve unit having two work connections for the two actuators, two valve connections for the two proportional pressure control valves, and one shared control connection for pushing open the pressure holding valves. The throttle connection is disposed between the two work connections in such a way that upon opening of the pressure holding valves, it is closed. For this purpose, the valve unit has a control slide, on which are disposed a control piston that can be acted upon by the pressure at the control connection, a first valve member that together with a valve seat controls a valve opening between one work connection and the associated valve connection, and a second valve member that together with a valve seat controls a valve opening between the other work connection and the associated valve connection. An axial bore is made in the control slide, at one end discharging in a valve chamber having the first work connection and at the other being connected via a throttle bore in the control slide with a valve chamber that communicates with the other work connection. The throttle bore is disposed such that upon the onset of axial displacement of the control slide it is closed from its valve position.

If in a further feature of the invention, an elastomeric seal that seals off from the applicable valve member is disposed on each valve seat and the corresponding seat valve is embodied as pressure-equalized in such a way that upon valve opening only a slight pressure difference prevails at the seal, then a technically absolutely pressure-tight pressure holding valve with a long service life is obtained.

In accordance with an improved embodiment of the invention, for pressure equalization upon valve closure, the valve members and valve seats are disposed and embodied such that upon valve closure, each valve member closes the valve opening prior to taking its seat on the elastomer seal.

In a preferred embodiment of the invention, the control piston is axially displaceably guided in a control chamber and subdivides it into a forward control chamber having the control connection and a rear control chamber that communicates with each of the two valve chambers, which have a valve connection. An equalization line, which includes a throttle or a check valve and which is blocked off in the opening terminal position of the control slide, is provided between the front and rear control chambers. This kind of construction design has the advantage that opening of the valve unit with the two seat valves can be effected only if the proportional pressure control valves are in their blocking position or in the "pressure delivery" position. This prevents a sudden, uncontrolled drop of the vehicle body as the leveling system comes into operation.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
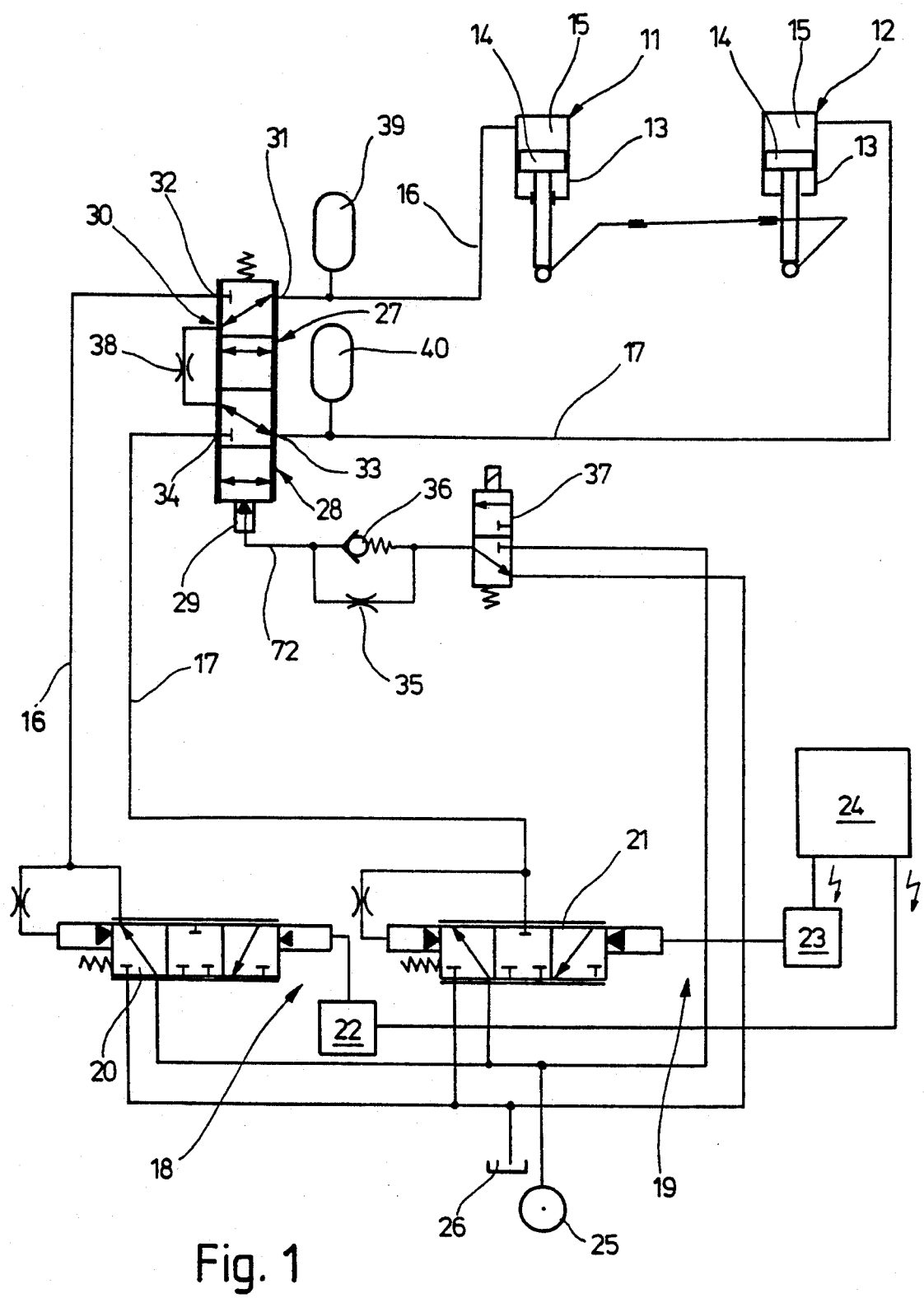
FIG. 1, a basic circuit diagram of a hydraulic leveling system for a vehicle.

The hydraulic leveling system shown in a basic circuit diagram in FIG. 1 serves to adjust the height of the vehicle body and the position of the vehicle body by suppressing relative motion between the vehicle body and the wheel supports. The wheel supports are part of suspension mechanisms disposed at the right and left front and right and left rear, and they support corresponding wheels rotatably. Between the vehicle body and each wheel support, there is one hydraulic work cylinder or actuator, of which in FIG. 1 only the two actuators 11 and 12 are shown, which are pivotably connected to the two wheel suspensions belonging to one vehicle axle. Each actuator 11, 12 has a work piston 14, guided axially displaceably in a hydraulic cylinder 13, which in the hydraulic cylinder 13 defines a work chamber 15 (also called a pressure chamber) that is filled with hydraulic oil or some such fluid. For controlling the pressure in the work chamber 15, each work chamber 15 communicates via a respective pressure line 16 and 17 with the work connection of a respective proportional pressure control valve 18 and 19.

As only schematically shown in FIG. 1, each proportional pressure control valve 18, 19 comprises a main valve 20 and 21, respectively, embodied as 3/3-way valves with spring restoration, and an electro-magnetically actuated pilot control stage 22, 23. The pilot control stages 22, 23 are connected to a control unit 24, which in turn communicates with a number of vehicle height meters, which are associated with the various suspension mechanisms and which sample the relative height of the vehicle body with reference to the respective wheel supports, and with body acceleration sensors. From the parameters furnished by the sensors, the control unit 24 generates appropriate signals for controlling the proportional pressure control valves 18, 19. Of the three controlled valve connections of the main valves 20, 21, the first valve connection represents the work connection of the pressure lines 16, 17, and the second valve connection communicates with a pressure fluid source 25, while the third valve connection communicates with a pressure fluid tank 26. The latter is formed by a hydraulic oil tank, while the pressure fluid source 25 is embodied by a feed pump that pumps hydraulic oil from the hydraulic oil tank. The three valve connections are controlled by a control slide into three slide positions such that in a middle slide position, all three valve connections are blocked off, and in the two slide positions located on either end the work connection communicates either with the pressure fluid source 25 or with the pressure fluid tank 26.

A pressure holding valve, embodied as first and second pressure-tight seat valves 27 or 28 (see FIG. 2), is disposed in each pressure line 16, 17 leading to the actuators 11, 12; the first and second seat valves 27, 28 are combined into one hydraulically controlled valve unit (combination valve 30) with a total of six valve connections, via one common control connection 29. Two valve connections at a time, 31, 32 and 33, 34, are incorporated into the respective pressure lines 16 and 17, while the control connection 29 of the combination valve 30 communicates via a control line 72 with a switching valve 37 embodied as a 3/2-way magnet valve. Two further valve connections serve to activate a throttle restriction 38. A throttle 35 and a check valve 36, parallel to it and having an open direction toward the switching valve 37, are incorporated in the control line 72. The switching valve 37 is embodied such that in its unexcited basic position, it connects the control connection 29 of the combination valve 30 with the pressure fluid tank 26 and in its reversed working position it connects it to the pressure fluid source 25. The combination valve 30 is embodied such that in its uncontrolled basic position, shown in FIG. 1, the two valve connections 32, 34 are blocked off, and the two valve connections 31, 33 communicate with one another via the throttle restriction 38, and that in its reversed working position the valve connections 31 and 32 communicate with one another while the valve connections 33, 34 communicate with one another, so that the two actuators 11, 12 each communicate with the respectively associated proportional pressure control valves 18 and 19, via the pressure lines 16, 17, which are switched open. In this working position, the throttle connection 38 between the valve connections 31, 33 is cancelled. One hydraulic reservoir 39 and 40, respectively, is also connected to each connection of the pressure lines 16, 17 to the work chambers 15.

Figure 2:
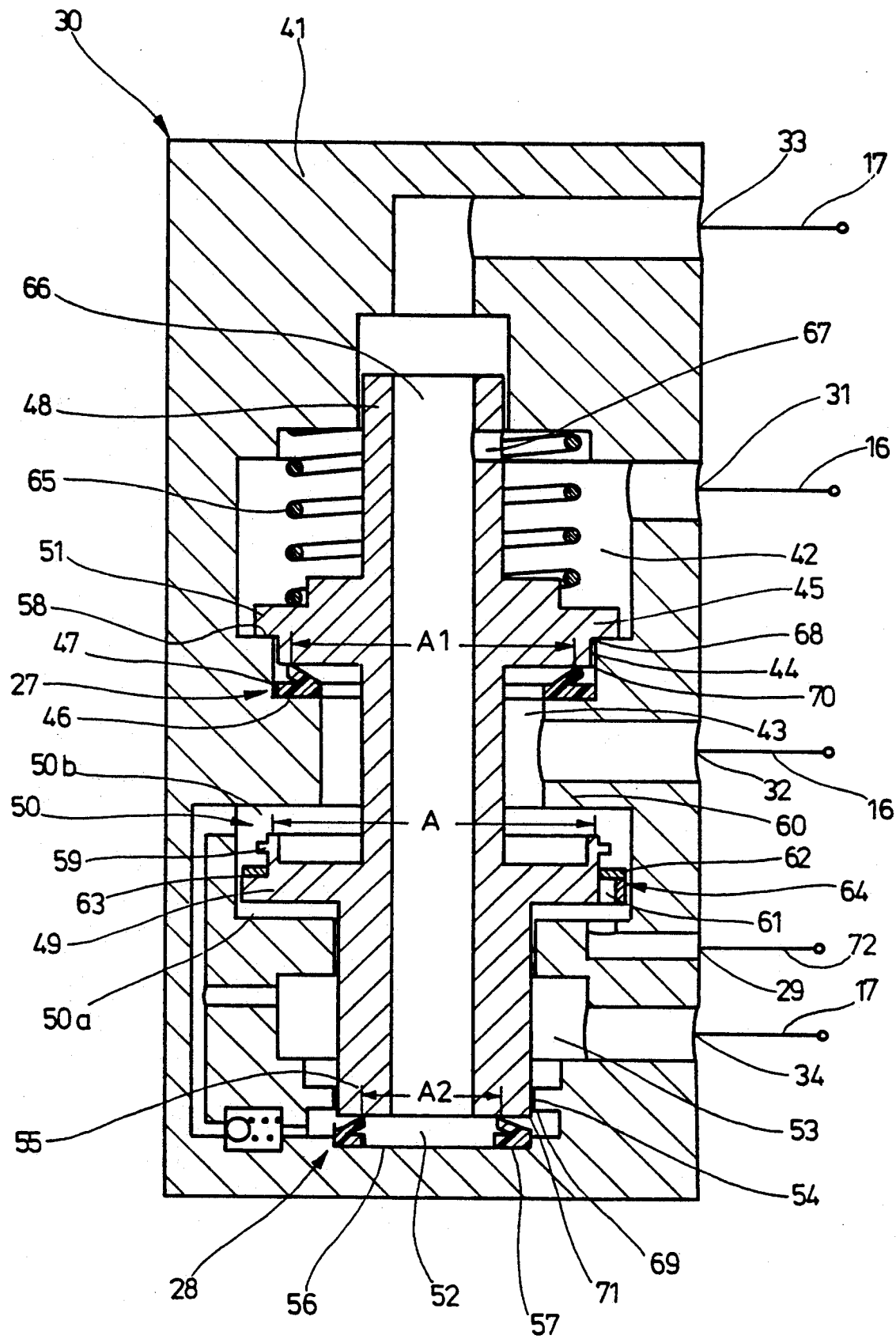
FIG. 2 is a schematic longitudinal section through a valve unit of the leveling system of FIG. 1.

FIG. 2 schematically shows an actual exemplary construction of the combination valve 30 in longitudinal section, but because of the structural integration of the throttle restriction 38, the two valve connections for literally tying in the throttle restriction 38 have been omitted. In a valve housing 41, the first and second seat valves 27, 28 are disposed axially one after the other. First seat valve 27 has a first valve chamber 42 and a second valve chamber 43 and said second valve has a third valve chamber 52 and a fourth valve chamber 53, which communicate with one another via respective valve openings 44 and 54. The first valve chamber 42 communicates with the valve connection 31, and the second valve chamber 43 communicates with the valve connections 32, and similarly the third valve chamber 52 carries the valve connection 33, while the fourth valve chamber 53 carries the valve connection 34. Each valve opening 44, 54 is controlled by a respective valve member 45 and 55 in combination with a valve seat 46 and 56, embodied on the valve housing 41. The two valve members 45, 55 are embodied on a control slide 48, which carries a control piston 49 that is axially displaceably guided in a control chamber 50 in the valve housing 41. An elastomer seal 47 and 57 is disposed on each valve seat 46 and 56, respectively, and in the closing state presses with a sealing lip against the respective valve member 45 and 55, so that each valve opening 44 and 54 is closed off in a leak-free manner. To relieve the elastomer seals 47, 57 from high compressive forces in the closing state of the seat valves 27, 28, the valve member 45 presses with a radially protruding annular flange 51 against an annular stop shoulder 58 embodied in the valve housing 41.

The control piston 49 subdivides the control chamber 50 into a forward control chamber 50a, which communicates with the control inlet 29, and a rear control chamber 50b, which communicates with the second and fourth valve chambers 43, 53 of the first and second seat valves 27, 28. Protruding from the piston face of the control piston defining the rear control chamber 50b is an annular rib 59, with which the control piston 49, in the opening terminal position of the combination valve 30, becomes seated on a radially protruding housing shoulder 60 defining the rear control chamber 50b. The diameter of the annular rib 59 is dimensioned as smaller than the outer diameter of the control piston 49 and larger than the diameter of contact of the valve members 45, 55 on their associated valve seats 46, 56. In the region of the control piston between its periphery and the annular rib 59, at least one longitudinally continuous axial bore 61 is provided in the control piston 49; on the side discharging into the rear control chamber 50b, this bore is covered by a sealing ring 62, which is retained on a piston shoulder 63 of the control piston 49. Together with the axial bore 61, the sealing ring 62 forms a check valve 64, so that there is a hydraulic connection from the forward control chamber 50a to the rear control chamber 50b, but this connection is blocked off in the opening terminal position of the valve 30 by the annular rib 59 seated on the housing shoulder 60.

The control slide 48 is acted upon in the closing direction of the first and second seat valves 27, 28 by a valve closing spring 65 that is located in the first valve chamber 42 of the seat valve 27 and is supported at one end on the valve housing 41 and on the other on the valve member 45. The initial tension of the valve closing spring 65 is selected to be extremely low. It serves merely to keep the control slide 48 in a defined closing position even if the first and second actuators 11, 12 are pressureless and to assure that at the instant of valve opening, the compressive force acting in the opening direction upon the control slide 48 is slightly greater than the compressive force acting in the closing direction upon the control slide 48. The control slide 48 is provided with a longitudinally continuous central bore 66, which establishes the communication between the third valve chamber 52 of the second seat valve 28 and the second valve connection 34. In the region of the first valve chamber 42 of the first seat valve 27, a throttle bore 67 is made in the cylindrical wall of the control slide 48. The throttle bore 67 is disposed such that in the closing position of the combination valve 30, it discharges freely into the first valve chamber 42, and with the onset of the displacement motion of the control slide 48 in the opening direction of the combination valve 30, it is covered by the valve housing 41. A throttle connection, which embodies the throttle position 38 shown in FIG. 1 between the two valve connections, thus exists between the first and third valve chambers 42, 52 of the first and second seat valves 27, 28 in the closing position of the combination valve 30. Via this throttle restriction 38 or throttle bore 67, the pressures in the work chambers 15 of the two actuators 11, 12 become equalized in the closing position of the seat valves 27, 28, so that unstable vehicle behavior cannot arise as a consequence of extremely different actuator pressures upon closure of the combination valve 30.

The combination valve 30 is pressure-tight over a long period because of the elastomer seals 47, 57, so that the pressure in the actuators 11, 12 virtually does not vary significantly, even when the vehicle is parked for long periods of time. For protecting seals 47, 57 and thus attaining a long service life, provision is made by means of the check valve 64, embodied in the control piston 49, that upon valve opening only a slight pressure difference prevails at the seals 47, 57. This pressure difference is determined solely by the ratio between the spring force and the difference between the pressure impingement faces on the valve members 45, 55 that are uncovered by the valve seats 46, 56. These pressure impingement faces are marked A1 and A2 in FIG. 2. To obtain the smallest possible pressure difference, the initial tension—as already mentioned—of the valve closing spring 65 is selected to be extremely low on the one hand, and on the other hand the difference A1−A2 is selected to be as great as possible.

In order to provide for the smallest possible pressure difference in the smallest possible flow speed at the seals 47, 57 even upon valve closure, the valve members 45, 55 and the valve seats 46, 56 are disposed and embodied such that upon valve closure of the seat valves 27, 28, each valve member 45 and 55 closes the valve opening 44 and 54 respectively, in advance of becoming seated on the valve seat 46 and 56. To this end, a circular control edge 68 and 69 is formed on the valve housing 41 on each seat valve 27, 28; this control edge cooperates with a control edge 70 and 71, embodied on the respective valve member 45 and 55, for controlling the valve opening 44 and 45. The control edge 70 and 71 embodied on the valve member 45 and 55 then encompasses the end face toward the valve seat 46 and 56 of the valve member 45 and 55.

The mode of operation of the leveling system described is as follows:

In FIG. 1, the leveling system is shown in the pressureless state. The combination valve 30 is closed, and the two actuators 11, 12 are pressure-equalized via the throttle restriction 38 (FIG. 1) or throttle bore 67 (FIG. 2). The actuator pressure acts upon the annular face A1−A2. After the leveling system has come into operation, the switching valve 37 is reversed. At the same time the proportional pressure control valves 18, 19 are triggered such that the main valves 20, 21 are in their blocking position in which they block off all the valve connections. Hydraulic oil flows into the forward control chamber 50a via the throttle 35 and into the rear control chamber 50b via the check valve 64, so that pressure builds up in the second and fourth valve chambers 43, 53 of the seat valve 27, 28. Once the pressure $p_1$ in the forward control chamber 50a has risen far enough to satisfy the condition $$p_1 \cdot (A1-A2) \geq p_2 \cdot (A1-A2) + F_{65} \quad (1)$$

where the left-hand term of equation (1) need be only slightly greater than the right-hand term, the control slide 58 begins to be displaced in order to open the seat valve 27, 28. In this equation, $p_2$ is the actuator pressure prevailing in the first and third valve chambers 42, 52, and $F_{65}$ is the spring force of the valve closing spring 65. The pressure difference prevailing at the seals 47, 57 upon opening of the seat valve 27, 28 is $$\Delta p = p_1 - p_2 = F_{65}/(A1-A2) \quad (2)$$

This pressure difference is very small, because of the above-described structural provisions.

As soon as the control edges 70, 71 on the valve members 45, 55 overtake the control edges 68, 69 in the valve housing 41, hydraulic oil can flow via the opened valve openings 44, 54. The pressure $p_2$ is thus established in the second and fourth valve chambers 43, 53. Since the pressure $p_1$ in the forward control chamber 50a is somewhat greater than the pressure $p_2$, the control slide 48 moves onward until the annular rib 59 on the bottom of the rear control chamber 50b strikes the housing shoulder 60 of the valve housing 41 and thus blocks the check valve 64. As a result, the effective pressure impingement area of the control piston 49 increases from A1−A2 to A −A2. The control slide 48 is retained in this opening terminal position of the combination valve 30. By suitably reversing one or the other proportional pressure control valves 18 or 19 to one or the other terminal position, the pressure in the work chamber 15 of the connected actuator 11 or 12 can now be increased or reduced.

If there is a defect in the leveling system, the switching valve 37 drops back to its basic position, in which the control inlet 29 of the combination valve 30 communicates with the pressure fluid sink 26. The control slide 48 is closed by the actuator pressure $p_2$ acting upon the valve members 45, 55, and the valve openings 44, 54 of the seat valves 27, 28 are substantially closed once the control edges 70, 71 on the valve members 45, 55 overtake the control edges 68, 69 in the valve housing 41. After a further displacement travel of the control slide 48, the valve members 45, 55 then become seated on the seals 47, 57 on the valve seats 46, 56.

If the proportional pressure control valves 18, 19 are open to the pressure fluid tank 26 when the switching valve 37 is switched over to its working position, then the combination valve 30 cannot be opened, since on account of the check valve 64 in the control piston 49 and the rear chamber 50b communicating with the second and fourth valve chambers 43, 53, no control pressure can build up in the forward control chamber 50a. If contrarily the proportional pressure control valves 18, 19 are located in the blocking direction or in a terminal position in which their work connections communicate with the pressure fluid source 25, then the pressure in the rear control chamber 50b is equal to that in the forward control chamber 50a, and the control piston 49 can be moved out of its closing position. This avoids an uncontrolled lowering of the vehicle body when the leveling system comes into operation.

The invention is not limited to the described exemplary embodiment of a hydraulically operating leveling system. Compressed air can also be used as the pressure fluid.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A leveling system for vehicles, having a vehicle body, wheels and axles for providing respective wheel suspensions, a first work actuator (11) assigned between a first wheel suspension and the vehicle body, a second work actuator (12) assigned between a second wheel suspension and the vehicle body, each of said first and second work actuators (11, 12) have one work piston (14) displaceable in a cylinder (13) and defining a pressure-fluid-filled pressure chamber (15), a first proportional pressure control valve (18) assigned to said first actuator, a second proportional pressure control valve (19) assigned to said second actuator, each of said first and second proportional pressure control valves (18, 19) having at least three switching positions for alternatingly connecting the respective actuator pressure chamber (15) to a pressure fluid pump (25), a pressure fluid tank (26) and for blocking off the pressure chamber, during a pressure chamber blocking phase of the first and second actuators (11, 12) their respective pressure chambers (15) communicate with one another through first and second pressure holding valves (27, 28) via a throttle (38; 67) said first and second pressure holding valves (27, 28) are embodied as pressure-tight seat valves and are disposed in a connection between the first and second proportional pressure control valves (18, 19) and the first and second actuators (11, 12) and that the throttle connection (38; 67) between the pressure chambers (15) of each of the first and second actuators (11, 12) is effected via the first and second pressure holding valves (27, 28).

2. The system of claim 1, in which the first and second pressure holding valves (27, 28) are combined into a single valve unit (30) having first and second valve connections (31, 33) for said first and second actuators (11, 12) and third and fourth valve connections (32, 34) for the first and second proportional pressure control valves (18, 19) as well as one common control connection (29) for opening the first and second pressure holding valves (27, 28), and that the throttle connection (38; 67) is disposed between the first and second valve connections (31, 33) in such a way that the throttle connection is closed upon opening of the first and second pressure holding valves (27, 28).

3. The system of claim 2, in which the valve unit (30) has a control slide (48), on which are disposed a control piston (49) and can be acted upon by the pressure at the common control connection (29), a first valve member (45) that together with a first valve seat (46) controls a first valve opening (44) between the first valve connection (31) and the third valve connection (32), and a second valve member (55) that together with a second valve seat (56) controls a second valve opening (54) between the second valve connection (33) and the fourth valve connection (34), an axial bore (66) is made in the control slide (48), which axial bore discharges at one end in a third valve chamber (52) having the second work connection (33) and on the other end communicates via a throttle bore (67) in the control slide (48) with a first valve chamber (42) communicating with the first work connection (31) and is disposed such that the throttle bore is closed from its valve closing position with the onset of an axial displacement of the control slide (48).

4. The system of claim 3, in which a first and second elastomer seal (47, 57) sealing off from the respective first and second valve member (45, 55) is disposed on each first and second valve seat (46, 56), and that each first and second seat valve (27, 28) is embodied as pressure-equalized in such a manner that upon valve opening and/or closing, only a slight pressure difference prevails at each first and second valve seat (46; 56).

5. The system of claim 4, in which the first and second valve members (45; 55) and first and second valve seats (46; 56) are disposed and embodied such that upon valve closure, each first and second valve member (45; 55) closes the first and second valve opening (44; 54) in advance of becoming seated upon the first and second valve seat (46; 56).

6. The system of claim 5, in which the control piston (49) is axially displaceably guided in a control chamber (50) and divides this chamber into a forward control chamber (50a) having the control inlet (29) and a rear control chamber (50b) that communicates with each of the second and fourth valve chambers (43, 53) having a third and fourth valve connection (32, 34), and that an equalization line (61) is provided between the forward and rear control chambers (50a, 50b), which includes a throttle (64) and is blocked off in the opening terminal position of the control slide (48).

7. The system of claim 6, in which the equalization line with the check valve (64) is embodied as at least one axial bore (61) in the control piston (49), on the mouth of which in the rear control chamber (50b) rests a sealing ring (62) that with the at least one axial bore (61) forms a flutter valve.

8. The system of claim 7, in which for blocking the equalization line (61) having the throttle (64), the control piston (49) has an axially protruding annular rib (59) on its piston face defining the rear control chamber (50b), this annular rib, in the opening terminal position of the control piston (49), becoming seated on a radially protruding housing shoulder (60) defining the rear control chamber (50b), and that the axial bore (61) is made in a piston region located between the annular rib (59) and the control piston edge.

9. The system of claim 6, in which for blocking the equalization line (61) having the throttle (64), the control piston (49) has an axially protruding annular rib (59)

on its piston face defining the rear control chamber (50b), this annular rib, in the opening terminal position of the control piston (49), becoming seated on a radially protruding housing shoulder (60) defining the rear control chamber (50b), and that the axial bore (61) is made in a piston region located between the annular rib (59) and the control piston edge.

10. The system of claim 3, in which the control piston (49) is axially displaceably guided in a control chamber (50) and divides this chamber into a forward control chamber (50a) having the control inlet (29) and a rear control chamber (50b) that communicates with each of the second and fourth valve chambers (43, 53) having a third and fourth valve connection (32, 34), and that an equalization line (61) is provided between the forward and rear control chambers (50a, 50b), which includes a throttle (64) and is blocked off in the opening terminal position of the control slide (48).

11. The system of claim 10, in which the equalization line with the check valve (64) is embodied as at least one axial bore (61) in the control piston (49), on the mouth of which in the rear control chamber (50b) rests a sealing ring (62) that with the at least one axial bore (61) forms a flutter valve.

12. The system of claim 11, in which for blocking the equalization line (61) having the throttle (64), the control piston (49) has an axially protruding annular rib (59) on its piston face defining the rear control chamber (50b), this annular rib, in the opening terminal position of the control piston (49), becoming seated on a radially protruding housing shoulder (60) defining the rear control chamber (50b), and that the axial bore (61) is made in a piston region located between the annular rib (59) and the control piston edge.

13. The system of claim 10, in which for blocking the equalization line (61) having the throttle (64), the control piston (49) has an axially protruding annular rib (59) on its piston face defining the rear control chamber (50b), this annular rib, in the opening terminal position of the control piston (49), becoming seated on a radially protruding housing shoulder (60) defining the rear control chamber (50b), and that the axial bore (61) is made in a piston region located between the annular rib (59) and the control piston edge.

14. The system of claim 3, in which each first and second valve member (45, 55) is embodied as a piston slide that becomes seated with one end face upon the first and second valve seat (46, 56), and that a control edge (68, 69) is formed on the valve housing (41) spaced apart from the first and second valve seat (46, 56) in the opening displacement of the control slide (48), which control edge, together with a control edge (70, 71) encompassing the outside of the first and second valve member (45, 55) on its end face toward the first and second valve seat (46, 56), controls the first and second valve openings (44, 54).

15. The system of claim 2, in which the control slide (48) is acted upon by a valve closing spring (65) in the valve closing direction with an extremely low spring force.

16. The system of claim 2, in which each first and second valve member (45, 55) is embodied as a piston slide that becomes seated with one end face upon the first and second valve seat (46, 56), and that a control edge (68, 69) is formed on the valve housing (41) spaced apart from the first and second valve seat (46, 56) in the opening displacement of the control slide (48), which control edge, together with a control edge (70, 71) encompassing the outside of the first and second valve member (45, 55) on its end face toward the first and second valve seat (46, 56), controls the first and second valve opening (44, 54).

17. The system of claim 2, in which a throttle (35) is disposed in a control line (72) leading to the control inlet (29).

18. The system of claim 17, in which the control line (72) is connected to a switching valve (37) embodied as a 3/2-way magnet valve, which in its unexcited basic position connects the control line (72) to a pressure fluid tank (26) and in its working position connects the control line to a pressure fluid source (25).

19. The system of claim 18, in which a check valve (36) having an opening direction toward the switching valve is connected parallel to the throttle (35).

20. A leveling system for vehicles, having a vehicle body, wheels and axles for providing respective wheel suspensions, a first work actuator (11) assigned between a first wheel suspension and the vehicle body, a second work actuator (12) assigned between a second wheel suspension and the vehicle body, each of said first and second work actuators (11, 12) have one work piston (14) displaceable in a cylinder (13) and defining a pressure-fluid-filled pressure chamber (15), a first proportional pressure control valve (18) assigned to said first actuator, a second proportional pressure control valve (19) assigned to said second actuator, each of said first and second proportional pressure control valves (18, 19) having at least three switching positions for alternatingly connecting the respective actuator pressure chamber (15) for a pressure fluid pump (25), a pressure fluid tank (26) and for blocking off the pressure chamber, a throttle connection (38; 67) leading out of the pressure chamber (15) of one of said first and second actuators (11, 12) into the pressure chamber (15) of the other of said first and second actuators (11, 12), wherein the throttle connection (38; 67) leads through a valve (30) that closes off the throttle connection (38; 67), and wherein the valve (30) is controlled such that the throttle connection (38; 67) is opened in a pressure chamber shutoff phase.

* * * * *